Figure 1:
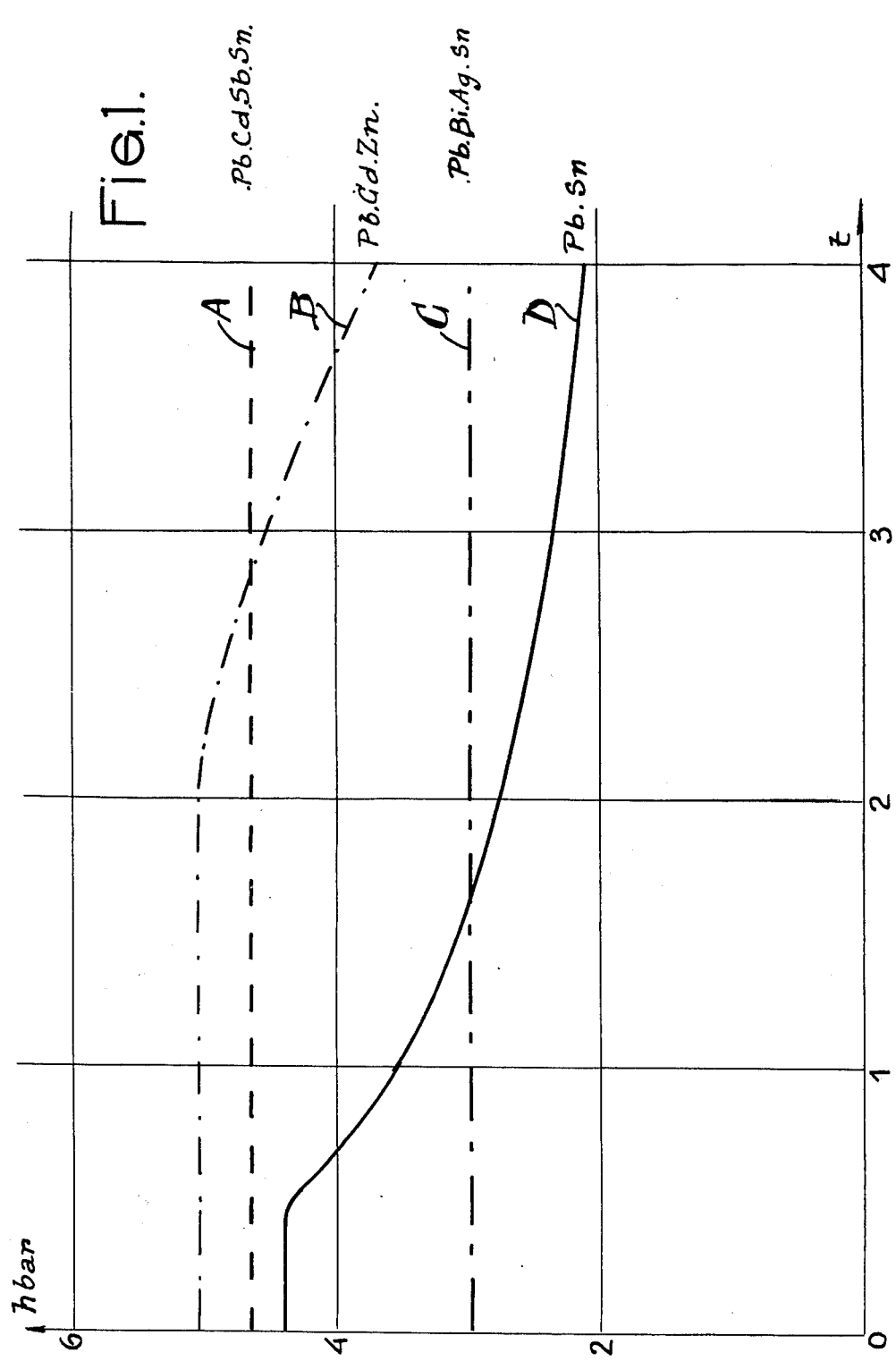

United States Patent [19]

Plegat

[11] 4,032,059

[45] June 28, 1977

[54] METHOD USING A SOLDERING ALLOY FOR CONNECTING PARTS OF WHICH AT LEAST SOME ARE MADE OF ALUMINIUM

[75] Inventor: Alain Edouard Plegat, Asnieres, France

[73] Assignee: Societe Anonyme des Usines Chausson, Asnieres, France

[22] Filed: Mar. 26, 1976

[21] Appl. No.: 670,846

Related U.S. Application Data

[62] Division of Ser. No. 566,991, April 11, 1975, Pat. No. 3,969,110.

[30] Foreign Application Priority Data

Mar. 28, 1975   France ............................. 75.13565

[52] U.S. Cl. .............................. 228/183; 75/166 C; 75/166 R; 228/263
[51] Int. Cl.² ......................................... B23K 35/26
[58] Field of Search ......... 75/166 C, 166 B, 166 R; 228/207, 263, 183

[56] References Cited

UNITED STATES PATENTS

| | | | |
|---|---|---|---|
| 1,452,750 | 4/1923 | Mulligan | 75/166 C X |
| 1,691,932 | 11/1928 | Müller et al. | 75/166 C |
| 1,953,844 | 4/1934 | Yerger et al. | 75/166 C |
| 2,303,194 | 11/1942 | Bouton et al. | 75/166 C |
| 3,744,121 | 7/1973 | Nagano | 75/166 C X |
| 3,769,007 | 10/1973 | Stokes et al. | 75/166 B |

*Primary Examiner*—L. Dewayne Rutledge
*Assistant Examiner*—E. L. Weise
*Attorney, Agent, or Firm*—Browdy and Neimark

[57] ABSTRACT

The soldering alloy comprises at least:

65 to 85% lead in weight
12 to 30% cadmium in weight
1 to 6% antimony in weight
0.5 to 1% tin in weight.

In a method for soldering metal parts, the parts are submitted to an organic flux on the portions thereof to be connected together, said portions are coated with the above mentioned soldering alloy, then they are heated to the liquidus temperature of the soldering alloy while being held together in contact.

4 Claims, 2 Drawing Figures

METHOD USING A SOLDERING ALLOY FOR CONNECTING PARTS OF WHICH AT LEAST SOME ARE MADE OF ALUMINIUM

This is a division of application Ser. No. 566,991, filed Apr. 11, 1975, now U.S. Pat. No. 3,969,110 dated July 13, 1976.

The present invention relates to a new composition of soldering alloys, also called soft brazing alloys of which the melting point is lower than 250° C, said alloy being especially designed to make possible the connection of various parts of which some at least are made of aluminum or aluminum alloy.

Though the alloy of the invention can be used for the connection of any parts, it is especially advantageous in the manufacture of heat exchangers from composite metals, i.e. typically heat exchangers of the type of the cooling or heating radiators for vehicles in which the tubes and possibly the end plates are made of so-called heavy metals, which means of cuprous or ferrous metals, while the heat disturbers, namely corrugated strips placed between the tubes, are made of aluminum.

In the technique of brazing alloys, various compositions are well known. The simplest one is constituted of a tin-lead alloy which may, for example have a content of 50 to 80% lead in weight and 30 to 50% tin in weight. This alloy which is relatively cheap, is used to make connections even when some of the parts are made of aluminum. Yet, such an alloy has serious disadvantages which make it improper to be used for assembling apparatus which will have to remain in a wet area. Actually, a very quick corrosion takes place, most of the time in the interfacial area extending between the joining alloy and the parts made of aluminum.

This well known disadvantage has required the search for improved alloys and especially there has been proposed alloys comprising only a very small content of tin, but a very high percentage of bismuth, for example, up to 50% bismuth allied to lead and to additives selected from among silver, zinc and indium.

Very improved results have thus been obtained regarding resistance to corrosion of the finished weldings, but such alloys are of a very high cost and must be used in relatively large quantities, far larger than the tin-lead alloy, to obtain an equal strength to shearing between the assembled parts.

For this reason, these known alloys cannot be practically used for industrial manufacture of a very large number of devices such as heat exchangers.

The present invention copes with the disadvantages of the tin-lead alloys by creating a new alloy composition of a cost which is not substantially higher than that of said tin-lead alloys and, besides the new alloy according to the invention has all the advantages of the above mentioned improved alloys and also additional advantages because the quantity of alloy to be used for performing a solder is not larger than the corresponding quantity of tin-lead alloy which would be used, and even less than that quantity, while obtaining a strength to shearing between the assembled parts which remains permanent or practically permanent in time, even in a wet atmosphere.

According to the invention, the soldering alloy having a lead base for the soldering or soft brazing of parts of which at least one part is made of aluminum or aluminum alloys and another part is made of heavy metal such as copper, brass, stainless steel and the like, comprises at least:

65 to 85% lead in weight
12 to 30% cadmium in weight
1 to 6% antimony in weight

This invention also relates to a method for very simply embodying the above mentioned soldering alloy. According to this second aspect of the invention, the method for the soldering of parts of which at least one part is made of aluminum or aluminum alloy, is characterized in that portions of the parts to be connected together are submitted to a fluxing step by means of an organic flux; covered, at least in said portions, with said soldering alloy; heated to liquidus temperature of said soldering alloy while being held together in contact; then cooled down to ambient temperature.

Various other features of the invention are moreover shown in the following detailed description.

For the embodiment of the soldering to be made, all usual means of the art can be used, i.e. flame solderings, iron solderings or ultra-sonic soldering, or any other means such as dipping.

The so-called soldering is performed with the presence of a flux of the type of those which are used for the soldering or soft brazing of aluminum, because it is necessary, for this metal and the alloys thereof to be soldered, to remove the coating of oxide which covers it and to prevent said coating of oxide to reappear during the heating required for the soldering.

Many and not very strong fluxes can be used. Organic fluxes, i.e. fluxes which do not obtain any chloride, are preferably used within the framework of the invention. Such fluxes can, for example, be constituted by zinc fluoroborate, diethylene-triamine and triethanolamine. Many other organic fluxes exist in the trade and can also be used.

The above mentioned soldering composition can comprise additional additives, especially it can contain a small quantity of tin, for example 0.5 to 1% in weight, because this metal improves the wetting of the solder. The above amount of 1% must not be exceeded because additions of tin reduce substantially the strength to corrosion of the interfacial coating between the aluminum and the solder.

Among the other additives which can be used, bismuth can be used in an amount of 0.5 to 5%, but the 5% amount is, preferably, not exceeded so as not to increase the cost of the soldering alloy, because of the high cost of the bismuth. It is the same regarding the silver which can be used in an amount of 0.2 to 1%.

Zinc is another additive which can be introduced in an amount of 0.2 to 1% to help the wetting of the aluminum by the soldering alloy and to increase the mechanical strength of the soldering alloy.

A preferred composition, having given suitable results, especially for soldering a sample made of brass on a sample made of aluminum, contained:

Pb 79.7% in weight
Cd 16.7% in weight
Sb 2.6% in weight
Sn 1% in weight

This welding alloy exhibits a quite exceptional strength to the corrosion effects in a wet medium, especially in a hot and wet medium, particularly for connection through soldering of parts made of aluminum, aluminum-copper, aluminum-brass and aluminum stainless steel, especially the quality of stainless steel Z 8 C17 in the AFNOR standard. This composition can also be held dipped in cold water for a period of time equal to 4 hours without any change resulting in the strength of the soldered connection and consequently allows the performance of various treatments, typically washing, which must follow the brazing step.

The alloy according to the above composition has a solids temperature of 234° C and a liquidus temperature of 242° C which permits its use along with most of the organic fluxes found in the trade and typically those sold for the aluminum under the name of Alcoa flux or Otalin.

FIG. 1 shows a set of curves obtained from respectively identical test-pieces made of brass-aluminum and respectively connected through soldering alloys having composition as mentioned below.

These test-pieces were constituted by a sheet of aluminum containing at least 99% of genuine aluminum and a sheet of brass U Z 33 in the AFNOR standard. The sizes of the aluminum sheet were: length 60 mm, width 20 mm, thickness 1.5 mm.

The alloy A was that mentioned above as being preferred and contained in weight:

Pb 79.7%
Cd 16.7%
Sb 2.6%
Sn 1%

The alloy B contained in weight:

Pb 77%
Cd 20%
Zn 3%

The alloy C contained in weight:

Pb 78.2%
Bi 20%
Sn 0.6%
Ag 1.2%

The alloy D contained in weight:
Pb 70%
Sn 30%

The test-pieces were dipped in cold water at 15° C then submitted to a shearing strength expressed in hbar on the axis of the ordinates, being understood that 1 hbar corresponds to breaking off of a rod having a section area of 1 square millimeter under a shearing strength of 1 kilogram.

The curves show the development of the stresses in time during the period of test of 4 hours and show that only the above alloys A and C have during the time of the experiment a constant strength to shearing with, yet, a noticeable advantage regarding the alloy A which supports a substantially higher strength to shearing.

The same weight of soldering alloy was of course used for each test-piece.

Figure 2:
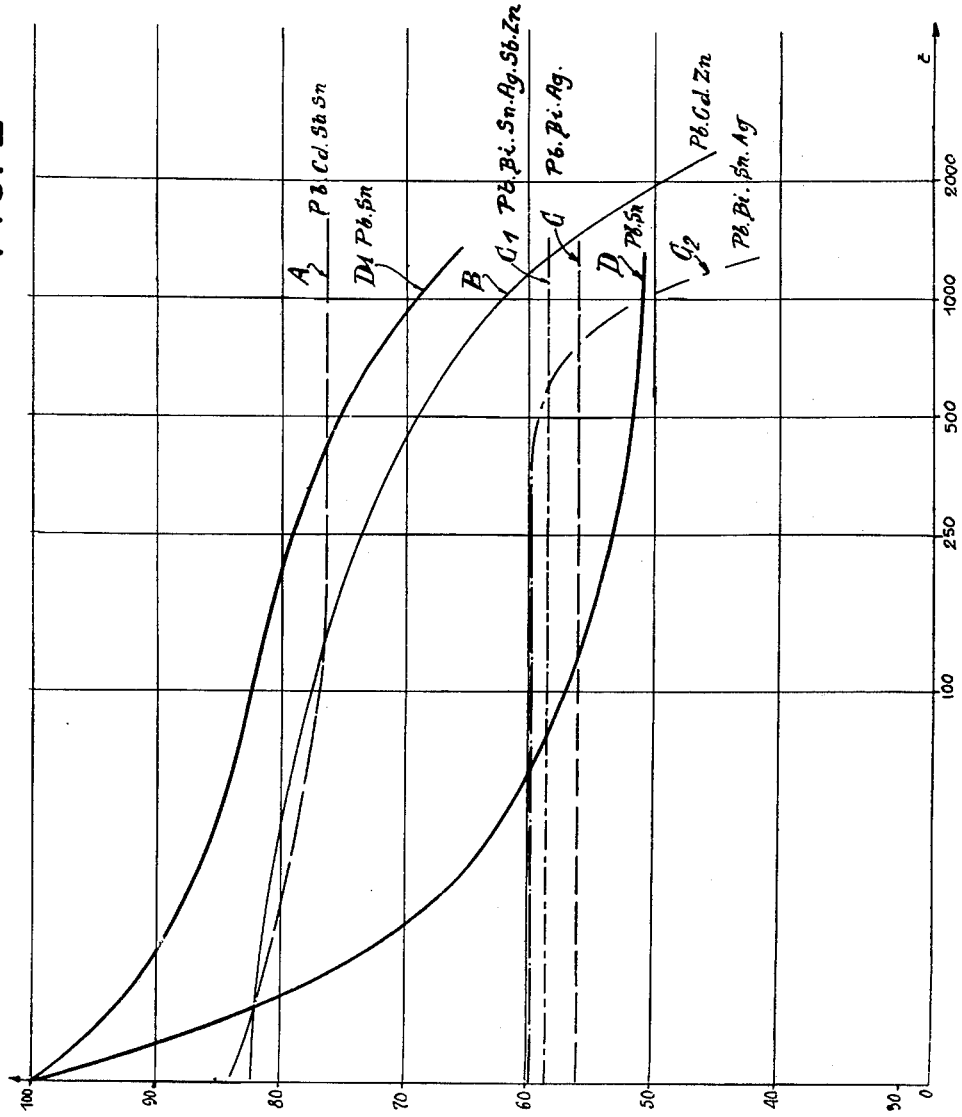

Other tests were also perfomred by holding said test-pieces in an atmosphere heated to 80° C and having a relative moisture of 65%. The periods of the tests extended up to 2,000 hours. The curves of FIG. 2 show results obtained for alloys having the above compositions A, B, C and D. On the curves of FIG. 2, the ordinates are expressed in percentage, 100% corresponding to a strength to shearing of 4.6 hbars and the time $t$ are expressed in hours on the $x$-axis.

As in the previous tests, it appears that the soldering compositions which are the more stable are the compositions A and C with an advantage for the composition A of the invention which always keeps a very substantially higher strength to shearing.

The test shown in FIG. 2 is particularly characteristic since it corresponds practically to strict conditions of use for apparatus such as heat exchangers.

Similar tests were made from other compositions than the above mentioned ones. The curve $C_1$ which is parallel to the curve C but above the same, correspond to the following composition:

Pb 79.8%
Bi 7.7%
Sn 8%
Ag 1%
Sb 1.5%
Zn 2%

The curve $C_2$ which is first above the curve $C_1$ then has a sudden drop. The composition of the alloy, from which this curve was obtained was:

Pb 30.8%
Bi 10%
Ag 1.2%
Sn 8%

It thus appears that tin which increases wetting of the soldering alloy constitutes, under the conditions of the tests, a disadvantage by probably causing an electric couple with the aluminum in the interfacial coating after a very short period of time of 500 hours.

It has appeared interesting, also, taking into consideration the very poor results found for the alloy of the curve, i.e. a tin-lead alloy, to show action of this same alloy at an ambient temperature of 18° C and a relative moisture of 65%. The results are those appearing on curve $D_1$ which shows that this alloy is satisfactory only during 500 hours at the utmost, its strength to shearing decreasing in a continuous way.

The invention is not restricted to the embodiments described in detail for various modifications thereof can moreover be applied thereto without departing from the scope of the invention as shown in the appended claims.

I claim:

1. A method of soldering parts of which at least one is made of aluminum or aluminum alloy, comprising the steps of:
   fluxing the parts to be connected together by means of an organic flux;
   covering at least said fluxed portions with a soldering alloy comprising
   65–85% lead by weight
   12–30% cadmium by weight
   1–6% antimony by weight
   0.5–1% tin by weight;
   heating said portions up to the liquidus temperature of the soldering alloy while holding said portions together; and
   cooling down to ambient temperature.

2. A method in accordance with claim 1 wherein said parts to be connected are portions of heat exchangers comprising heat distributors made of aluminum in contact with circulation tubes made of a metal selected from the group consisting of copper, brass, stainless steel and the like.

3. A method in accordance with claim 1 wherein said soldering alloy further contains additives selected among:
bismuth 0.5–5% by weight
zinc 0.2–1% by weight
silver 0.2–1% by weight 4. A method in accordance with claim 1 wherein said soldering alloy consists essentially of:
Pb 79.7 % by weight
Cd 16.7% by weight
Sb 2.6% by weight
Sn 1% by weight
to give an alloy having solidus-liquidus temperatures of respectively 234° C and 242° C.

* * * * *

UNITED STATES PATENT AND TRADEMARK OFFICE
CERTIFICATE OF CORRECTION

PATENT NO. : 4,032,059
DATED : June 28, 1977
INVENTOR(S) : Alain Edouard Plegat

It is certified that error appears in the above-identified patent and that said Letters Patent are hereby corrected as shown below:

Title page, [30] Foreign Application Priority Data should read:

--April 18, 1974 France ........ 74.13565--

Column 2, line 33, "obtain" should read --contain--

Column 3, line 11, "solids" should read --solidus--

Column 3, line 64, "perfomred" should read --performed--

Signed and Sealed this

Thirty-first Day of July 1979

[SEAL]

*Attest:*

*Attesting Officer*

LUTRELLE F. PARKER
*Acting Commissioner of Patents and Trademarks*